Patented Dec. 21, 1937

UNITED STATES PATENT OFFICE 2,102,654

METHODS FOR PRODUCING DECOMPOSITION PRODUCTS FROM OLEFINE-SO$_2$ COMPLEXES

Robert Dewey Snow, Bartlesville, Okla., assignor to Phillips Petroleum Company, Bartlesville, Okla., a corporation of Delaware No Drawing. Application January 26, 1934, Serial No. 708,523

21 Claims. (Cl. 260—43)

This invention relates to methods for producing chemical compounds by reacting olefine-sulfur dioxide complexes with alkaline substances, and to the products resulting therefrom.

More specifically it pertains to methods for producing organic acid products and/or their salts, neutral oily products and organic decomposition products by means of reacting olefine-sulfur dioxide complexes with aqueous or alcoholic alkali or alkaline earth hydroxide solutions, ammonium hydroxide, liquid ammonia, and amines or other substituted ammonia compounds.

One object of the invention is to form neutral oily products by reacting alkaline solutions with the complex reaction products of olefines and SO$_2$.

Another object is to produce useful organic acid products and/or their salts by the reaction of the complexes of unsaturated compounds and SO$_2$ with aqueous or alcoholic alkaline solutions, either with or without a subsequent partial oxidation of the reaction products by means of air, oxygen or other oxidizing agents.

A further object comprises the manufacture of useful organic products by reacting ammonium hydroxide or anhydrous ammonia with the complex reaction products of SO$_2$ and unsaturated compounds.

A still further object is the production of a series of useful decomposition products of the complex of SO$_2$ and unsaturated compounds with any primary or secondary amino compound. In this series there is a compound for every possible combination of every unsaturated compound or its oxide which will react with SO$_2$, with every amino compound containing the groups

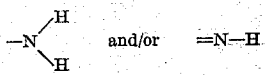

Methods of reacting sulfur dioxide with various unsaturated compounds to form complexes of a crystalline or resinous nature have been known for a long time. Proposals to utilize these products by dissolving in solvents to form lacquers and by molding with heat and pressure have been made. (Matthews and Elder, Brit. 11,635, 1914; Fitch and Frey patent application Serial No. 599,350, filed March 16, 1932.) In the case of the products of diolefines and SO$_2$, the thermal decomposition of the complex to regenerate the diolefine and SO$_2$ has been proposed by Strange and Graham and used in the purification of the diolefines. (Schotz, "Synthetic Rubber", Van Nostrand, New York, 196, p. 125). However, no previous mention of processes involving the treatment of these complexes formed by reaction of SO$_2$ and unsaturated compounds with chemicals to convert them to other compounds containing sulfur and oxygen, or the use of such complexes as intermediate compounds for the production of useful materials containing sulfur and oxygen, has been made.

I have found that these complexes of SO$_2$ and unsaturated compounds formed in sunlight and/or in the presence of catalysts, are relatively very stable to acids. Most of them may be heated to 100° C., or above, in concentrated nitric or sulfuric acid with practically no chemical attack. On the other hand, I have found that alkaline chemical agents, including anhydrous ammonia and amines and their solutions react with SO$_2$-olefine complexes at a rate which depends upon the unsaturated compound combined with the SO$_2$ and the alkaline chemical or amine used. For example, I have found that the resinous product formed by the reaction of SO$_2$ and propylene is rapidly decomposed by 5 per cent NaOH solution at 0° C. No gas is evolved during the decomposition. The product is completely soluble in the caustic solution, and practically none of it can be extracted with ether. Butene-2-SO$_2$ resin, on the other hand, is far more resistant to attack by alkaline reagents. The reaction with 20 percent NaOH solution is very slow at room temperature and only moderately rapid at 80° C. One of the products is a neutral oily material. Practically all of these complexes react with ammonium hydroxide solution, those of the lower unsaturated compounds such as ethylene and propylene forming products which are soluble in the ammonia solution and those of the higher unsaturated compounds such as hexene-1 and heptene-1 forming crystalline products insoluble in the ammonia solution. The SO$_2$ complexes are at first dissolved by liquid ammonia, but in a short time thereafter crystalline solids usually begin to separate. Depending upon the proportion of liquid ammonia present, the entire mass may solidify. Similar reactions take place between the SO$_2$ complexes and organic amines or other substituted ammonia compounds.

The resinous complexes obtained by reacting the 1-olefines, (alpha olefines) such as ethylene, propylene, butene-1, pentene-1, hexene-1, heptene-1, with SO$_2$, react readily with relatively dilute alkalis at ordinary temperatures to form salts of organic sulfur acids which in general are soluble in the dilute alkaline solution. If, however, concentrated caustic solutions and elevated temperatures are used, more or less of an amorphous insoluble material and an oil extractable by ether may be formed. For example, propylene-SO$_2$ resin when decomposed with 50 percent NaOH solution at 90–100° C. gave 5.5 percent of a brown amorphous material and 6 percent of a neutral oil extractable by ether. With 50 percent NaOH solution at room temperature, the same resin gave only a trace of the amorphous solid material and 5.3 percent of neutral oil extractable by ether. With 10 percent NaOH solution at 0° C. the decomposition was complete in two hours and the product was a clear solution containing no material extractable by ether. The butene-1-SO₂ resin gave 8.5 percent of ether-extractable, neutral oil with a 50 percent NaOH solution at 90° C., 6.5 percent of oil with a 50 percent NaOH solution at 25° C. and 5.5 percent of oil with a 17 percent NaOH solution at 25° C. The SO₂ resins of pentene-1, hexene-1 and heptene-1, when decomposed with concentrated NaOH, gave two liquid phases, the lighter of which was an aqueous solution of sodium salts of organic sulfur acids. When water is added, the products become homogeneous. They contain little or no material extractable by ether.

In general, then, the products obtained by decomposing the SO₂ complexes of the 1-olefines with alkalis consist almost entirely of water soluble salts of organic sulfur acids (probably sulfinic acids). Small quantities of an amorphous solid and a neutral oily product may be produced, especially if too strong caustic and/or too high a temperature are used.

The soluble salts can be further modified by partial oxidation by air, oxygen, or other chemical oxidizing agents to produce still other products. For example, the solution obtained by decomposing propylene resin with 10 percent NaOH at 0° C. was treated with an equivalent quantity of KMnO₄ (to give one atom of O for every SO₂ group in the resin used). The mixture was filtered and most of the water was distilled under vacuum. The product was then acidified with H₂SO₄. The Na₂SO₄ was filtered off and the mother liquor was concentrated by heating under vacuum. A viscous fluid which became a glassy solid on cooling was obtained.

The decomposition of resins from the 2-olefines is best carried out with 30–50 percent alkali and at temperatures in the range 60–100° C. As one product of the decomposition of the SO₂ complex of a 2-olefine by strong alkalis there is obtained 25–40 percent of a neutral oily product. This oily product can be extracted from the caustic solution with ether, or other immiscible solvent, or can be salted out of solution. The oil obtained by caustic decomposition of the butene-2-SO₂ resin boils at 274–276° C. at 750.9 mm., and has a specific gravity of 1.1128, a viscosity of 60 sec. at 100° F. and a sulfur content of 17.35 percent. Similar oily products are obtained by decomposing SO₂ resins of pentene-2 and hexene-2. The analyses and physical properties show that these oils are practically pure compounds of carbon, hydrogen, sulfur and oxygen.

The mother liquor, after extraction of the neutral oily product, contains another reaction product in the form of salts of acidic compounds of carbon, hydrogen, sulfur and oxygen. These acids may be separated in the form of an oily layer by acidifying the mother liquor and extracting with ether or other immiscible solvent. The following table shows the relative yields of products obtained from resins of 2-olefines:

| Resin of— | Yield of neutral oil extracted from caustic solution—per cent | Yield of acidic product extracted from acidified solution—per cent |
|---|---|---|
| Butene-2 | {31 / 24} | |
| Pentene-2 | 37 | 42.4 |
| Hexene-2 | 31 | 44.5 |

The SO₂ resin of the cyclic olefine, cyclohexene, was found to be more resistant to attack by alkali, and heating with strong caustic solution for several hours was required to complete the decomposition. A 37 percent yield of a solid material which crystallized in colorless needles was obtained by extracting the caustic solution with ether. The solution was then made slightly acid with HCl and again extracted with ether. A 25 percent yield of a thick yellow liquid was obtained.

The SO₂ complexes of unsaturated compounds other than simple olefinic hydrocarbons, such as undecylenic acid and allyl alcohol, behave similarly towards alkaline reagents.

Ammonium hydroxide solutions also decompose the resins, those of the higher olefines forming insoluble white solids and those of the lower olefines forming water soluble products. For example, ethylene resin and propylene resin are dissolved completely by NH₄OH to form a clear solution, whereas the resins of pentene-1, isopropylethylene and heptene-1 are converted to white crystalline compounds. The product from heptene-1 crystallizes from chloroform or benzene as shiny plates.

Liquid ammonia dissolves the SO₂ complexes rapidly and in large quantities, but within a few minutes thereafter a chemical reaction occurs with the deposition of a white crystalline solid. This reaction has been found to take place with every resin tried; namely, those of propylene, butene-1, butene-2, pentene-1 and heptene-1; and is probably general for all of the complexes. It is thought that the products are alkyl sulfonamides, but this has not yet been proved.

Primary and secondary substituted amines generally dissolved the SO₂ complexes, following which a chemical reaction occurred at a rate depending upon the amine used. In most cases a crystalline solid was formed by this reaction. The amines, which have been tested and found to react with each of several resins, are:

Primary amines
  Methylamine
  N-butylamine
  Allylamine
  Benzylamine
  Hydrazine hydrate
  Ethylenediamine hydrate
  Aniline Secondary amines
  Diethylamine
  Di-n-butylamine
  Piperidine } heterocyclic
  Morpholene }

The anhydrous tertiary amines apparently do not dissolve or decompose the resins appreciably even at the boiling point. However, when the resin is boiled with a mixture of tertiary amine and water, a crystalline product is formed. This may be due to the alkalinity of the substituted ammonium hydroxide. The following tertiary amines have been tried:

Trimethyl amine in 33% alc.
  Triethyl amine
  Tri-n-butylamine
  Triethanolamine
  Pyridine (heterocyclic)

Examples of methods of practicing the processes are:

1. One mol. of an unsaturated compound, such as butene-2, allyl alcohol, or undecylenic acid, is added to one mol. or more of $SO_2$ and is allowed to react in sunlight or ultraviolet light, or in the presence of 0.01–0.1 percent of a suitable catalyst such as the nitrate of silver, lithium, ammonium, or potassium. When reaction is complete, the excess $SO_2$ is allowed to evaporate and the resinous material is ground. The ground resin is then reacted with a 30–50 percent aqueous solution containing at least one mol. of NaOH at temperatures in the range 30–90° C. The caustic solution is then extracted with ether or other immiscible solvent, and the neutral reaction product is recovered by evaporating the ether from the extract. The mother liquor may then be treated in either of two ways: (1) it may be acidified and extracted with an immiscible solvent, or (2) it may be partially oxidized by air, oxygen, or chemical oxidizing agent such as $KMnO_4$, filtered, acidified with a strong mineral acid, evaporated, and the organic product extracted by an organic solvent.

2. The $SO_2$— complex obtained as in Example 1 is placed in a pressure vessel and liquid ammonia, preferably in excess of one molecular weight of $NH_3$ to one molecular weight of $SO_2$ present in the resin, is added. The liquid and solid are mixed thoroughly to facilitate the dissolution of the resin. The mixture is allowed to stand for about one-half hour at room temperature. The excess ammonia is then evaporated, leaving the reaction product as a crystalline solid or a viscous liquid.

3. The $SO_2$ complex obtained as in Example 1 is dissolved in a primary or secondary amine compound, preferably having the quantities of amine compound in excess of the proportion of one molecular weight of amine to one molecular weight of $SO_2$ in the resinous complex. The process of solution may be accelerated by warming. The mixture is allowed to stand until reaction is complete. The reaction may require from one-half to 48 hours, depending upon the amine and the resin. After completion of the reaction, the excess amine is removed by evaporation or by dissolving in water or weak acid solution. The product may be purified further by recrystallization from an organic solvent such as benzene or chloroform.

4. The $SO_2$ complex obtained as in Example 1 is allowed to stand in contact with an excess of strong $NH_4OH$ until the completion of the reaction is indicated by the amorphous resin particles going into solution or being entirely converted to crystals. The product may be recovered by filtration or by evaporation of the water and excess $NH_3$.

The processes are not limited to the $SO_2$-complexes of the simple olefine hydrocarbons, but apply equally well to the $SO_2$ complexes of any unsaturated compound, or oxide of an unsaturated compound, that will react with $SO_2$.

Neither are the processes of Examples 1 and 2 limited to NaOH. The hydroxides of metals of the alkali and alkaline earth metals may be used, as may some of their salts of weak acids.

While aqueous solutions of alkalies may be conveniently used to effect decomposition of olefine-sulfur dioxide complexes, other suitable solvents, such as the alcohols, may also be used. In the case of ammonia and amines, the decomposition may be conducted in the absence of added solvent or the alkali may be introduced in the gaseous condition.

The products obtained by the decomposition of $SO_2$ complexes may be applicable to many uses. For example, the oils obtained by decomposing the 2-olefines resins are only sparingly soluble in the lower paraffin hydrocarbons, whereas they are miscible with the aromatic hydrocarbons. On the basis of this selective solubility behavior these oils could be used to extract aromatic hydrocarbons from such mixtures as cracked gasolines, and to extract lubricating oil from paraffin wax thus providing a means for the solvent extraction of oils. The oils may also be used for many other special solvent purposes. They are good plasticizers for many of the $SO_2$-unsaturated compound complexes. They may also be used as rubber softeners and as filling and reviving agents for leather.

The alkali salts obtained by decomposing the resins, especially those of the higher olefines and olefinic carboxylic acids, show marked detergent properties and may be used as soap substitutes, emulsifying agents, etc.

It is to be understood that in the processes above set forth, any of the products may be prepared by starting with the unsaturated compounds and sulfur dioxide, or from the previously formed sulfur dioxide complex of the unsaturated compound. By sulfur dioxide complex, it should be understood that I mean those products of high molecular weight formed when sulfur dioxide is reacted with substances containing an ethylene linkage. As examples of such substances are the products formed by the reactions described in Examples 1, 2 and 4 of British Patent 11,635 (1914) but I do not limit myself to the use of these three products, but include all other products formed by similar reactions described generally as "polymerization products" in accordance with the definition of polymerization given by Carothers (Chem. Rev. 8, 355, 1931).

Having described my invention, what I claim is:

1. The process of producing useful products which comprises decomposing high molecular weight heteropolymeric compounds of sulfur dioxide and unsaturated organic compounds by means of alkaline chemical agents, whereby the said heteropolymeric compounds are broken down into organic compounds of relatively low molecular weight containing sulfur and oxygen.

2. The process of producing organic compounds of relatively low molecular weight containing sulfur and oxygen, which comprises reacting sulfur dioxide with organic compounds containing the olefinic double bond to form polymeric compounds of relatively high molecular weight, then treating the said polymeric compounds with an alkaline solution thereby decomposing the said polymeric compounds and producing organic compounds of relatively low molecular weight containing sulfur and oxygen.

3. The process of producing organic compounds of relatively low molecular weight containing sulfur and oxygen, which comprises reacting sulfur dioxide with an organic compound containing the olefinic double bond to form polymeric compounds of relatively high molecular weight, and then decomposing the said polymeric compounds with an alkaline solution.

4. The process of producing organic compounds of relatively low molecular weight containing sulfur and oxygen, which comprises reacting a mixture of unsaturated organic compounds and sulfur dioxide to form polymeric compounds of relatively high molecular weight, and decomposing the said polymeric compounds with an alkaline solution.

5. The process of producing organic compounds of relatively low molecular weight containing sulfur and oxygen, which comprises reacting sulfur dioxide and unsaturated organic compounds to form polymeric compounds of relatively high molecular weight, separating the said polymeric compounds from any unreacted materials, and then treating the said polymeric compounds with an alkaline solution to produce the organic compounds of relatively low molecular weight containing sulfur and oxygen by decomposition.

6. The process of producing organic compounds of relatively low molecular weight containing sulfur and oxygen, which comprises reacting sulfur dioxide and an unsaturated organic compound to form polymeric compounds of relatively high molecular weight, then separating the said polymeric compounds from any unreacted materials, and then decomposing the said polymeric compounds with a hot alkaline solution.

7. The process of producing organic compounds of relatively low molecular weight containing sulfur and oxygen, which comprises reacting sulfur dioxide with an unsaturated organic compound whereby polymeric compounds of relatively high molecular weight are formed, and then treating the said polymeric compounds with a caustic soda solution, whereby the cleavage of a part of the bonds between sulfur and carbon in the polymeric compounds occurs.

8. The process of producing organic compounds of relatively low molecular weight containing sulfur and oxygen, which comprises reacting sulfur dioxide with unsaturated organic compounds, whereby polymeric compounds of relatively high molecular weight are formed, then separating the said polymeric compound from any unreacted materials, and then decomposing the said polymeric compounds with a caustic soda solution.

9. The process of producing organic compounds of relatively low molecular weight containing sulfur and oxygen, which comprises reacting sulfur dioxide and unsaturated organic compounds to form polymeric compounds of relatively high molecular weight, then treating the said polymeric compounds with an alkaline chemical agent, whereby the polymeric compounds are broken down, and then separating the said organic compounds of relatively low molecular weight containing sulfur and oxygen from the decomposition products.

10. The process of producing organic compounds of relatively low molecular weight containing sulfur and oxygen from relatively high molecular weight polymeric compounds formed by the reaction of sulfur dioxide with unsaturated organic compounds, which comprises decomposing the said polymeric compounds with an alkaline solution.

11. A process of producing organic compounds of relatively low molecular weight containing sulfur and oxygen from relatively high molecular weight polymeric compounds formed by the reaction of sulfur dioxide with organic compounds containing the ethylenic double bond, which comprises decomposing the said polymeric compounds with a solution of an alkaline chemical agent of the group: hydroxide of an alkali metal, hydroxide of an alkaline earth metal, salt of an alkali metal and a weak acid.

12. The process of producing organic compounds of relatively low molecular weight containing sulfur and oxygen from polymeric compounds of relatively high molecular weight formed by the reaction of sulfur dioxide with an unsaturated compound, which comprises decomposing the said polymeric compounds with a caustic soda solution.

13. The process of producing organic compounds of relatively low molecular weight containing sulfur and oxygen from polymeric compounds of relatively high molecular weight formed by the reaction of sulfur dioxide with unsaturated compounds, which comprises decomposing the said polymeric compounds with an alkaline solution, and separating the said organic compounds of relatively low molecular weight containing sulfur and oxygen from the decomposition product.

14. The process of producing organic compounds of relatively low molecular weight containing sulfur and oxygen from polymeric compounds of relatively high molecular weight formed by the reaction of sulfur dioxide with unsaturated compounds, which comprises decomposing the said polymeric compounds with a caustic soda solution, and separating the said organic compounds of relatively low molecular weight containing sulfur and oxygen from the decomposition product.

15. The process of producing organic compounds of relatively low molecular weight containing sulfur and oxygen, which comprises decomposing by means of a solution of a hydroxide of an alkali metal, the heteropolymeric compounds of relatively high molecular weight formed by the reaction of sulfur dioxide and an unsaturated body, and separating from the decomposition products the desired organic compounds.

16. The process of producing organic compounds containing sulfur, oxygen, which comprises reacting addition complexes of sulfur dioxide and compounds containing the ethylenic double bond with an amine body of the group primary amines, secondary amines, and ammonia.

17. Process as in claim 16 in which the amine body is ammonia.

18. Process as in claim 16 in which the amine body is a secondary amine.

19. Process as in claim 16 in which the amine body is piperidine.

20. The process of producing organic compounds containing sulfur and oxygen, which comprises decomposing heteropolymeric compounds of sulfur dioxide and compounds containing the ethylenic double bond with an alkaline chemical agent, and then partially oxidizing the decomposition product.

21. The process of producing organic compounds containing sulfur and oxygen, which comprises decomposing heteropolymeric compound containing the ethylenic double bond, whereby salts of sulfinic acids are formed, and then partially oxidizing the said salts of sulfinic acids.

ROBERT DEWEY SNOW.